United States Patent [19]

Zucchini et al.

[11] 4,089,808

[45] May 16, 1978

[54] CATALYSTS FOR THE POLYMERIZATION OF OLEFINS, METHOD OF PREPARING THE SAME

[75] Inventors: Umberto Zucchini, Milan; Illaro Cuffiani, Ferrara, both of Italy

[73] Assignee: Montedison S.p.A., Milan, Italy

[21] Appl. No.: 695,034

[22] Filed: Jun. 11, 1976

[30] Foreign Application Priority Data

Jun. 12, 1975 Italy .............................. 24287 A/75
Jul. 25, 1975 Italy .............................. 25758 A/75

[51] Int. Cl.$^2$ .............................................. B01J 31/02
[52] U.S. Cl. ................................. 252/429 C; 252/441
[58] Field of Search ........................... 252/429 C, 441

[56] References Cited

U.S. PATENT DOCUMENTS

| | | | |
|---|---|---|---|
| 3,642,746 | 2/1972 | Kashiwa et al. ............... | 252/429 C |
| 3,888,835 | 6/1975 | Ito et al. ........................ | 252/429 C |
| 3,917,575 | 11/1975 | Matsuura et al. ............... | 252/429 C |
| 3,953,414 | 4/1976 | Galli et al. ...................... | 252/429 C |

*Primary Examiner*—Winston A. Douglas
*Assistant Examiner*—John F. Niebling

[57] ABSTRACT

New olefin polymerization catalysts are disclosed which are prepared by mixing (A) the product obtained by contacting
  (1) a halogen-containing, or a halogen free, oxygen-containing organic compound of Ti, V or Zr, with
  (2) a hydrocarbon-insoluble solid product containing at least metal M and halogen and resulting from decomposition of a complex having the formula (I) $MX_2 \cdot nAlRX_2 \cdot pAlX_3$ to M dihalide, or to a product containing M dihalide.

In formula (I):

M is Ba, Ca, Mg or Mn;

X is chlorine or bromine in the case of $MX_2$ and $AlX_3$, and chlorine, bromine or alkoxy group in the case of $AlRX_2$;

R is a hydrocarbon radical containing from 1 to 20 carbon atoms;

n is a number from 1 to 4, inclusive;

p is a number from 0 to 1, inclusive;

$1 \leq n + p \leq 4$; with (B) an organometallic compound of a metal belonging to Groups I–III of the Mendelyeev Periodic Table, In the decomposition product of formula (I) M in the M dihalide has the same significance as M in formula (I).

24 Claims, No Drawings

CATALYSTS FOR THE POLYMERIZATION OF OLEFINS, METHOD OF PREPARING THE SAME

THE PRIOR ART

No prior art disclosing the present catalysts or the use thereof in the homo- and co-polymerization of olefins is known.

THE PRESENT INVENTION

An object of the present invention is to provide new catalysts for the (co) polymerization of ethylene and alphaolefins, i.e., olefins containing at least three carbon atoms, to high yields of polymer in gms/gm of Ti, V or Zr used.

This and other objects are achieved by this invention in accordance with which ethylene, alpha-olefins containing at least three carbon atoms, or mixtures thereof, are polymerized in contact with a catalyst prepared as set forth in the foregoing abstract of Disclosures from a complex of formula (I) in which R is preferably an alkyl radical containing from 1 to 10 carbon atoms, a cycloalkyl radical containing from 6 to 8 carbon atoms, or an aryl radical.

Examples of halogen-containing Ti, V or Zr compounds which are useful in preparing the catalysts include: $TiCl_3$, $TiCl_4$, $TiBr_4$, $TiI_4$, $TiCl_3OCH_3$, $Ti(O-n-C_3H_7)_2Cl_2$, $Ti(O-n-C_4H_9)Cl_3$, $Ti(O-n-C_4H_9)_2Cl_2$, $Ti(O-n-C_4H_9)_3Cl$, $Ti[N(C_2H_5)_2]Cl_3$, $Ti[N(C_6H_5)_2]Cl_3$, $Ti(OOC-C_6H_5)Cl_3$, $VCl_4$, $VOCl_3$, $ZrCl_4$.

Halogen-free, oxygen-containing organic compounds of Ti, V or Zr which can be used in preparing the present catalysts are compounds in which the organic radical contains from 1 to 20, preferably from 1 to 8, carbon atoms and is bound to the metal through an oxygen atom. Examples of the useful compounds of this type include the alcoholates, phenolates, acetylacetonates, and alkyl or polyoxyalkyleneglycol esters of acids derived from the metals. Specific examples include the following: $Ti(O-n-C_3H_7)_4$; $Ti(O-n-C_4H_9)_4$; $Ti(OC_6H_5)_4$; polyoxyethyleneglycol orthotitanates; $V(O-n-C_3H_7)_4$; $VO(O-n-C_3H_7)_3$; $V(acetylacetonate)_3$; $Zr(O-n-C_4H_9)_4$.

Typical examples of the complexes of formula (I) are: $MgCl_2.2AlC_2H_5Cl_2$; $MgCl_2.2,5Al-i-C_4H_9Cl_2$; $MgCl_2.1,5Al-n-C_4H_9Cl_2$; $CaCl_2.4AlC_2H_5Cl_2$; and $BaCl_2.AlCl_3.AlC_2H_5Cl_2$.

Decomposition of the complex $MX_2.nAlRX_2.pAlX_3$ to the product comprising compounds containing at least metal M and halogen, for contacting with the Ti, V or Zr compound to obtain component (A) of the catalysts according to this invention, may be carried out according to various methods. A preferred method consists in reacting the compound of Ti, V or Zr with the complex itself, in a M/transition metal atomic ratio ranging from 0.1 to 50 or higher, at a temperature generally comprised between 0° and 150° C or even below 0° C, but preferably comprised between 20° and 140° C, and in separating the solid reaction product from the liquid phase. Said reaction may be conducted according to various modalities, for example:

(a) the reaction may be conducted in a hydrocarbon diluent, such as n-hexane, n-heptane or cyclohexane, or by dissolving the complex in a compound $AlRX_2$ in which R and X have the same meaning as in formula (I);

(b) the complex may be pulverized in the presence of the transition metal compound;

(c) the complex, prior to the reaction with the transition metal compound in a hydrocarbon diluent may be activated by grinding.

The extent to which the complex is decomposed by reaction with the Ti, V or Zr compound depends on the operating conditions and on the particular Ti, V or Zr compound used.

According to another embodiment of the invention, component (A) is prepared by direct reaction of the transition metal compound in situ with each individual component of the complex of formula (I), for example by reacting $TiCl_4$ with $MgCl_2$ and $AlC_2H_5Cl_2$. That reaction is preferably carried out in an inert hydrocarbon solvent at a temperature higher than 20° C and, generally, at a temperature of from 50° to 120° C. The order in which the reagents are introduced into the reaction zone does not exert any appreciable influence on the activity of the catalysts. An Al/Ti ratio higher than 1.0 is employed.

Other methods of decomposing the complex of formula (I) are the following:

(d) the complex, in suspension in a hydrocarbon solvent, is decomposed by treatment with an excess of gaseous Hcl at room temperature;

(e) the complex, preferably in suspension in a hydrocarbon solvent, is decomposed by reaction with a Lewis base, or with an aliphatic or cycloaliphatic alcohol containing 1 to 20 carbon atoms, at a temperature comprised between $-20°$ and $+150°$ C, or by reaction with an organometallic compound of the metals of Groups I, II or III, in particular with compounds $AlR_2X$, in which R is an alkyl, cycloalkyl or aryl radical containing from 1 up to 20 carbon atoms, and X is a halogen or a hydrocarbon group like R, the latter reaction being preferably conducted at the boiling temperature of the hydrocarbon medium.

Because the complex is decomposed by compounds $AlR_2X$, which are generally used as component (B) of the catalyst, the transition metal compound is surely, and in any case, in contact with the decomposition product of the complex when the polymerization takes place. The decomposition with the Lewis base may be effected in a wide temperature range. The reaction is more or less complete and yields a complex made up of $AlRX_2$ and the base. The decomposition products of the complex generally contain metal M, halogen, and, optionally, also Al and R groups. If Al and R groups are not present, the decomposition product consists of the halide $MX_2$. In the decomposition products containing Al and R groups, the Al/R ratio is higher than in the starting complex.

A particular advantage of the catalysts of this invention consists in that the complex may be dissolved in an excess of Al-alkyl dihalide, and the solution can be used to impregnate an inert carrier containing the transition metal compound, or to which the transition metal compound may be added after the impregnation.

Particularly useful carriers are $\gamma$-$Al_2O_3$ and $SiO_2$ having a high surface area and a pores volume exceeding 0.3 cc/g, $TiO_2$, $ZrO_2$ or polymers. In this way "supported catalysts" are obtained, which have all of the advantages of these new catalysts plus the advantages of a supported catalyst.

Component (B) of the catalyst is preferably an Al trialkyl or an Al dialkyl monohalide, in which the alkyl radicals contain from 1 to 6 carbon atoms.

Some typical examples of organometallic compounds of the metals of Groups I, II or III to be employed as component (B) of the catalysts are the following: $Al(C_2H_5)_3$, $Al(i-C_4H_9)_3$, $Al(C_2H_5)_2Cl$, $Al_2(C_2H_5)_3Cl_3$, $Al(n-C_3H_7)_2Cl$, $Al(i-C_4H_9)_2H$, $Al(i-C_4H_9)H_2$, $Zn(C_2H_5)_2$.

The molar ratio component (B) transition metal compound is higher than 1 and is generally comprised in a wide range: in preferred embodiments the ratio is higher than 100.

The catalysts according to this invention are particularly suitable for the polymerization of ethylene, propylene or mixtures of ethylene and propylene which may contain hydrocarbon compounds having two or more double bonds. The polymerization is carried out in a liquid phase or in a gas phase according to conventional methods. The liquid phase may consist of the monomer to be polymerized or may comprise an inert hydrocarbon diluent, such as butane, pentane, hexane, heptane, cyclohexane, etc.

The polymerization temperature is generally comprised between 0° and 100° C. The (co)polymerization of ethylene and of alpha-olefins is preferably carried out at temperatures between 50° and 90° C, at atmospheric or at a higher pressure.

The present catalysts can be used to polymerize propylene to a polypropylene consisting at least predominantly of isotactic macromolecues, i.e., macromolecules having substantially the isotactic structure and being insoluble in boiling n-heptane. Preferably, to accomplish that purpose, component (B) of the catalyst is an addition product, or complex, with a Lewis base as described in Italian Patent No. 932,438.

The following examples are given to illustrate the invention in more detail and are not intended to be limiting.

The Examples illustrate both the preparation of components (A) of the catalyst and the polymerization of ethylene and propylene in contact with the final catalyst obtained by mixing the component (A) with component (B).

The results of the examples are reported in a number of Tables which show both the data relevant to preparation of component (A) of the catalyst and the results obtained by using the final catalysts in the polymerization of olefins.

In all instances, the polymerization was carried out under the following conditions:

One liter of anhydrous hexane, 1.5 g of $Al(i-C_4H_9)_3$ as co-catalyst (component B) and, finally, a proper amount of catalyst component (A) prepared from reagents (1) and (2) were introduced, in that order and in a nitrogen atmosphere, into a 2.5-liter autoclave, equipped with a stirrer. The mixture was heated to 85° C, whereupon 3 atm. of hydrogen (molecular weight modifier) and 10 atm. of ethylene were introduced, ethylene being then continuously fed for 4 hours. The suspension was discharged from the autoclave and filtered, and the polyethylene was dried in an oven to constant weight.

The yield is expressed in grams of polymer obtained per gram of transition metal used.

The melt-index of the polymer was measured according to standard ASTM D 1238 (conditions E) and is expressed in g/10 min.

The complex $MgCl_2.2AlC_2H_5Cl_2$ was prepared as follows: 4.65 g of anhydrous $MgCl_2$ in powder form were mixed, in a glass flask equipped with magnetic stirrer and in a nitrogen atmosphere, with 20 cc of $AlC_2H_5Cl_2$. The mixture was heated to 100° C, with continuous stirring at that temperature for 20 hours. The resulting solution was admixed, after cooling to 20° C, with 300 cc of anhydrous n-heptane. The precipitate which formed was filtered in a nitrogen atmosphere on fritted bottom G 3, then repeatedly washed on such bottom with portions of 50 cc of anhydrous n-pentane for each washing, and finally dried under vacuum (0.5 mm Hg) at 20° C for a few hours. 10.7 g of a white solid powder were obtained, having the formula $MgCl_2.2AlC_2H_5Cl_2$ and a melting point (measured in a tube welded in a nitrogen atmosphere) of 165° C with decomposition.

Analysis - Found: Mg = 6.89%; Al = 15.61%; Cl = 61.50%; ethane (gas volumetric analysis by decomposition with n-octanol) = 16.0%. Calculated: Mg = 6.96%; Al = 15.44%; Cl = 60.91%; ethane = 16.68%.

The other complexes used in the Examples were prepared analogously.

Table I reports the details of Examples 1 to 8 in which catalyst components (A) were prepared by reaction between reagents (1) and (2) in n-heptane, and the utilization of the final catalysts obtained by mixing the catalyst components (A) with component (B) in the polymerization of ethylene. It may be noticed that the catalyst activity increases as the Mg/Ti atomic ratio in the catalyst increases. The catalyst of Example 6 exhibits a particularly high activity, as it was prepared starting from a complex previously activated by grinding, besides having a very favorable Mg/Ti ratio.

EXAMPLES 1 TO 5

150 cc of thoroughly anhydrous n-heptane along with a suitable amount of $TiCl_4$ were introduced into a 250 cc glass flask equipped with a stirrer and a reflux cooler. A corresponding amount of $MgCl_2.2AlC_2H_5Cl_2$ in powder form was introduced batchwise into the flask, at room temperature and over a period of 30 minutes. The mixture was heated to the boiling point of the solvent (98° C), and held under refluxing for 1 hour. After cooling, the resulting brown solid product was filtered on fritted bottom G3 in a nitrogen atmosphere, thoroughly washed on the filter with n-heptane until the Cl' ions were eliminated from the filtrate, and dried under vacuum at 50° C to constant weight.

EXAMPLE 6

6 g of $MgCl_2.2AlC_2H_5Cl_2$ were introduced into a 350 cc porcelain jar containing 5 porcelain balls having a diameter varying from 20 to 40 mm. The jar was fastened in a centrifugal mill, which was rotated at room temperature for 2 hours. 3 g of the solid thus obtained were treated with 0.164 g of $TiCl_4$ as in Examples 1 to 5, but at the temperature of 20° C instead of 98° C.

EXAMPLE 7

Example 6 was repeated, but employing a different Mg/Ti atomic ratio.

EXAMPLE 8

Example 6 was repeated, but the reaction with the Ti compound was conducted at 98° C instead of at 20° C.

TABLE I

Reaction of Complex MgCl$_2$ . 2AlEtCl$_2$ with TiCl$_4$

| Example No. | MgCl$_2$ . 2AlEtCl$_2$ g | TiCl g | Mg/Ti in Reaction | Al/Ti in Reaction | Catalyst Analysis Ti % | Mg/Ti | Al/Ti | Polymerization of Ethylene Catalyst g | Polymer g | Yield | Melt Index |
|---|---|---|---|---|---|---|---|---|---|---|---|
| 1 | 8.30 | 4.58 | 0.98 | 1.96 | 1.96 | 1.11 | 1.04 | 0.0126 | 138 | 92,000 | 0.25 |
| 2 | 4.93 | 0.54 | 5.03 | 10.06 | 4.15 | 4.87 | — | 0.0207 | 160 | 200,000 | 0.10 |
| 3 | 9.50 | 0.521 | . | . | 4.20 | 8.25 | — | 0.0146 | 191 | 310,800 | 0.20 |
| 4 | 5.00 | 5.60 | 0.48 | 0.96 | 12.45 | 0.64 | 1.32 | 0.0071 | 87 | 108,750 | 0.15 |
| 5 | 7.30 | 1.32 | 3.03 | — | 10.30 | 2.28 | 0.38 | 0.0207 | 337 | 160,500 | 0.20 |
| 6 | 3.00 | 0.16 | 10.62 | 21.24 | 0.10 | — | — | 0.056 | 146 | 2,600,000 | 0.67 |
| 7 | 4.90 | 2.55 | 1.04 | — | 5.40 | 2.48 | — | 0.0116 | 105 | 168,000 | 0.42 |
| 8 | 8.30 | 0.40 | 11.30 | — | 4.40 | 7.47 | — | 0.020 | 307 | 349,000 | 0.40 |

Table II reports Examples 9 to 12 illustrating the preparation of catalyst components (A) by pulverization of the complex in the presence of reagent (1) in a porcelain jar fastened in a centrifugal mill.

The pulverization was carried out with the same modalities as in Example 6, the only difference consisting in that the time required by such operation was 4 hours.

In these examples, also, it may be noticed that the yield increases as the Mg/Ti atomic ratio increases.

TABLE II

Pulverization of the Complex in the Presence of Reagent $^{(1)}$

| Ex. No. | MgCl$_2$ .2AlEtCl$_2$ g | MgCl$_2$ . 2,5Al-iBuCl$_2$ g | TiCl$_3$HR g | Ti(OCH$_3$)Cl$_3$ g | Mg/Ti in React. | Al/Ti in React. | Catalyst Analysis Ti % | Polymerization of Ethylene Catalyst g | Polymer g | Yield | Melt Index |
|---|---|---|---|---|---|---|---|---|---|---|---|
| 9 | 8.0 | — | — | 1.1 | 3.88 | 7.76 | 2.75 | 0.03 | 305 | 381,250 | 0.39 |
| 10 | 8.0 | — | 3.60 | — | 0.98 | 1.96 | 9.55 | 0.0148 | 230 | 164,280 | 0.093 |
| 11 | 8.0 | — | 0.36 | — | 9.80 | 19.60 | 1.10 | 0.0233 | 162 | 632,180 | 0.65 |
| 12 | — | 6.0 | 0.30 | — | 6.50 | 16.30 | 0.95 | 0.0623 | 296 | 592,000 | 1.10 |

$^{(1)}$ TiCl$_3$HR or Ti(OCH$_3$) Cl$_3$

Table III reports the details of Example 13 in which a catalyst component (A) was prepared by reacting, in a solvent, MgCl$_2$.2AlEtCl$_2$ with VOCl$_3$.1.25 g of VOCl$_3$ dissolved in 50 cc of anhydrous n-heptane were introduced into a 100 cc glass flask, in a nitrogen atmosphere. 5.0 g of MgCl$_2$.2AlC$_2$H$_5$Cl$_2$ were added thereto in 30 min., at room temperature and under stirring. At the conclusion of the addition, the stirring was continued for a further 2 hours. A solid product was thus obtained; it was filtered and washed with n-heptane on the filtering fritted bottom. Finally, the product was dried under vacuum at 40° C to constant weight.

TABLE III

Catalyst from VOCl$_3$

| Example No. | MgCl$_2$ . 2AlEtCl$_2$ g | VOCl$_3$ g | Mg/V in reaction | Al/V in reaction | Catalyst Analysis V % | Mg/V | Al/V | Polymerization of Ethylene Catalyst g | Polymer g | Yield | melt index |
|---|---|---|---|---|---|---|---|---|---|---|---|
| 13 | 5.0 | 1.25 | 1.98 | 3.96 | 5.90 | 1.79 | 4.18 | 0.041 | 89 | 37,100 | 0.093 |

Table IV reports the details of Examples 14 and 15, in which MgCl$_2$.2AlEtCl$_2$ (kept in solution in AlEtCl$_2$ at 100° C) was reacted with TiCl$_4$ under the following conditions:

A suitable amount of a solution of MgCl$_2$.2AlEtCl$_2$ in AlEtCl$_2$ (such solution contained 15.7% of MgCl$_2$ and was kept at 100° C to prevent it from solidifying) was dropped, in 15 minutes, under stirring, into a 10% heptane solution of TiCl$_4$ cooled to −5° C. The resulting brown suspension was brought to room temperature and stirred for a further 2 hours.

Subsequently, the liquid phase was removed by decantation and siphoning, and the solid was washed with n-heptane until the elimination of the Cl′ ions from the solvent. The product was then dried under vacuum at 50° C to constant weight.

TABLE IV

Catalysts from MgCl$_2$ . 2AlEtCl$_2$ Dissolved in AlEtCl$_2$

| Example No. | Solution of MgCl$_2$ . 2AlEtCl$_2$ g | TiCl$_4$ g | Mg/Ti in reaction | Al/Ti in reaction | Catalyst Analysis Ti % | Mg/Ti | Al/Ti | Polymerization of Ethylene Catalyst g | Polymer g | Yield | Melt Index |
|---|---|---|---|---|---|---|---|---|---|---|---|
| 14 | 100.0 | 4.3 | 7.26 | 29.2 | 6.0 | 4.54 | 1.18 | 0.0234 | 303 | 216,400 | 3.20 |
| 15 | 28.3 | 8.0 | 1.10 | 4.4 | 10.8 | 0.62 | 1.68 | 0.0131 | 239 | 170,700 | 0.16 |

Table V reports the operating conditions of Examples 16 to 19 in which catalyst components (A) were prepared directly from MgCl$_2$, AlEtCl$_2$ and TiCl$_4$, i.e., the complex MgCl$_2$.2AlEtCl$_2$ was not pre-prepared. In these Examples, anhydrous MgCl$_2$ was used in the form of flakes, having a surface area $\leq 1$ m$^2$/g.

Examples 16 and 17 were carried out as follows: a suitable amount of anhydrous MgCl$_2$ in flakes was suspended in 50 cc of n-heptane along with TiCl$_4$; keeping a temperature of 10° C, AlEtCl$_2$ in the form of a heptane solution containing 55.5 g of AlEtCl$_2$/100 cc of solution was dropped into the suspension over a period of 30 minutes.

The temperature was then gradually raised to the boiling point of the heptane and the heating was continued under refluxing for 1 hour. The suspension was allowed to cool to room temperature and filtered, the resulting solid was washed 5 times with n-heptane and dried under vacuum at 50° C to constant weight.

EXAMPLE 18

Example 16 was repeated, the only difference being that TiCl$_4$ diluted in 50 cc of n-heptane was dropped into the suspension of MgCl$_2$ and AlEtCl$_2$ in 30 cc of heptane (inverted order of addition).

EXAMPLE 19

10 g of anhydrous MgCl$_2$ in the form of flakes were treated with 26.6 g of AlC$_2$H$_5$Cl$_2$ (Mg/Al atomic ratio = ½) in 50 cc of heptane at 98° C for 1 hour. The reaction product was filtered and repeatedly washed with heptane. 8.8 g of such product reaction product (z) containing Mg = 19.75%; Al = 3.40%; Cl = 73.05% suspended in 50 cc of n-heptane were added, in 30 minutes at room temperature, with 15.7 g of TiCl$_4$ and the whole was reacted for 1 hour at 98° C.

The resulting suspension was cooled to room temperature and filtered. The solid thus obtained was washed 5 times with heptane and dried under vacuum at 50° C to constant weight.

A portion of the product thus obtained was introduced into a 250 cc glass flask along with a suitable amount of TiCl$_4$ dissolved in 50 cc of n-heptane. It was heated to the heptane reflux temperature, maintaining such temperature for 1 hour under stirring. After cooling, it was filtered, the resulting solid product was washed with n-heptane until elimination of the Cl' ions from the filtrate and dried under vacuum at 60° C to constant weight.

EXAMPLE 24

In this Example, the carrier was first impregnated with TiCl$_4$ and then with MgCl$_2$.2AlEtCl$_2$.

20.8 g of Al$_2$O$_3$ Grade B produced by AKZO Chemie (calcined at 700° C for 5 hours) and 104 cc of TiCl$_4$ were introduced into a 250 cc glass flask and, under stirring, the resulting mixture was heated for 1 hour to the reflux temperature of TiCl$_4$ (136° C).

After cooling, the mass was filtered, and the solid was washed with n-heptane until the TiCl$_4$ not fixed on the carrier was removed. The product was then dried under vacuum at 60° C.

Subsequently, 10.1 g of the product thus obtained (containing 2.35% of Ti) were impregnated with 12.5 g of a solution of MgCl$_2$.2AlEtCl$_2$ in AlEtCl$_2$, according to the same modalities as described in Examples 20 to 23 for impregnation of the carrier with MgCl$_2$.2AlEtCl$_2$.

TABLE V

Preparation of Catalysts Starting from MgCl$_2$, AlEtCl$_2$ and TiCl$_4$

| Example No. | MgCl$_2$ Anhydrous g | TiCl$_4$ | AlEtCl$_2$ g | Mg/Ti in Reaction | Al/Ti in Reaction | Catalyst Analysis Ti % | Mg/Ti | Al/Ti | Catalyst g | Polymer g | Yield | Melt Index |
|---|---|---|---|---|---|---|---|---|---|---|---|---|
| 16 | 4.2 | 8.24 | 11.15 | 1.01 | 2.02 | 12.55 | 0.93 | 0.99 | 0.015 | 255 | 136,000 | 0.025 |
| 17 | 9.0 | 1.78 | 23.90 | 10.16 | 20.32 | 4.00 | 9.75 | 1.56 | 0.021 | 93 | 110,700 | 0.025 |
| 18 | 4.2 | 8.24 | 11.15 | 1.01 | 2.02 | 12.55 | — | — | 0.0156 | 217 | 110,880 | 0.034 |
| 19 | 10.0 | (*) | 26.6 | — | — | 8.05 | — | — | 0.0251 | 77 | 38,100 | 0.054 |

(*) 8.8 g of the reaction product z reacted with 15.7 g of TiCl$_4$

Table VI gives the details of Examples 20 to 24 in which the catalysts were supported on silicas or on γ-alumina pre-calcined for some hours at 500° to 700° C in a dry nitrogen flow.

EXAMPLES 20 to 23

Table VI

Catalyst Supported on Silica or on Alumina

| Example No. | Carrier Type | Solution of MgCl$_2$.2AlEtCl$_2$ g | Treated carrier g | TiCl$_4$ g | Supported Catalyst Analysis Ti % | Mg/Ti | Supported Catalyst g | Polymer g | Melt Yield | Tetraline Index | [η] 135° C |
|---|---|---|---|---|---|---|---|---|---|---|---|
| 20 | SiO$_2$ MAS 350 (Rhone Progil) | 20.2 | 25 | 10 | 0.184 | 0.8 | 4.55 | 0.2064 | 278 | 163,500 | 0.22 | 2.2 |
| 21 | SiO$_2$ F/2 (Akzo Chemie) | 20.0 | 25 | 10 | 0.184 | 0.9 | 3.38 | 0.1150 | 277 | 266,000 | 0.06 | — |
| 22 | Al$_2$O$_3$ Grade B (Akzo Chemie) | 20.0 | 25 | 10 | 0.184 | 1.1 | 1.52 | 0.1012 | 221 | 200,900 | 0.073 | 2.3 |
| 23 | Al$_2$O$_3$ 13-1 (I.C.I.) | 24.6 | 25 | 11.3 | 0.208 | 0.95 | 2.8 | 0.0660 | 127 | 211,700 | 0.104 | 2.4 |
| 24 | Al$_2$O$_3$ Grade B (Akzo Chemie) | 20.8 | Treatment with TiCl$_4$ at 136° C; 10.1 g of product treated with 12.5 g of solution of MgCl$_2$.2AlEtCl$_2$ | | | 2.05 | 0.62 | 0.02 | 78 | 195,900 | 0.30 | 2.1 |

In these examples the operations were as follows: a given amount of carrier was introduced into a 250 cc glass flask immersed in an oil bath kept at about 100° C. 25 g of a solution of MgCl$_2$.2AlEtCl$_2$ in AlEtCl$_2$ (at 15.7% by weight of MgCl$_2$) kept at about 100° C were added to the carrier in 10 minutes, under stirring.

Successively, 150 cc of n-heptane were added, keeping the latter at reflux temperature (98° C) for 1 hour. After cooling, the mixture was filtered, the resulting solid product was repeatedly washed with n-heptane until the Cl' ions were eliminated from the filtrate, and the solid was dried under vacuum at 60° C to constant weight.

Table VII gives the details of Examples 25 to 28 in which catalyst components (A) were prepared starting from the MgCl$_2$.2AlEtCl$_2$ complex decomposed by treatment with n-butyl ether, AlEt$_3$, anhydrous HCl or with ethyl alcohol.

EXAMPLE 25

The complex MgCl$_2$.2AlEtCl$_2$ was treated for 2 hours with anhydrous n-butyl ether (AlEtCl$_2$/n-butyl ether molar ratio = 1) at 50° C in 100 cc of heptane. The product obtained after filtration and several washings with heptane had, on analysis, a Mg content of 23.35% and an Al content of 0.55%. It was reacted with TiCl$_4$ as described in Examples 1 to 5.

times with heptane and dried under vacuum at 50° C to constant weight.

TABLE VII

Catalysts obtained from MgCl$_2$ . 2AlEtCl$_2$ decomposed by using various decomposition agents

| Example No. | MgCl$_2$ . 2AlEtCl$_2$ g | Decomposition Agent Type | Complex Decomposition Product g | TiCl$_4$ g | Catalyst Analysis Ti % | Polymerization of Ethylene | | | |
|---|---|---|---|---|---|---|---|---|---|
| | | | | | | Catalyst g | Polymer g | Yield | Melt Index |
| 25 | 30 | Butyl ether | 24.0 | 4.0 | 7.84 | 1.60 | 0.0074 | 115 | 970,000 | 0.40 |
| 26 | 30 | AlEt$_3$ | 19.7 | 5.2 | 10.3 | 0.30 | 0.0191 | 127 | 2,220,000 | 0.27 |
| 27 | 20.2 | Anhydrous HCl in excess | | 8.0 | 3.9 | 9.65 | 0.032 | 165 | 53,500 | 0.43 |
| 28 | 30.5 | Ethyl alcohol | 9.5 | 3.5 | 51.5 | 2.40 | 0.0037 | 198 | 2,240,000 | 0.43 |

EXAMPLE 26

A suspension of MgCl$_2$.2AlEtCl$_2$ in 100 cc of heptane was gradually added with AlEt$_3$ dissolved in 50 cc of heptane (AlEtCl$_2$/AlEt$_3$ molar ratio = 1). The mixture was heated to 98° C and held at that temperature for 1 hour. After cooling, it was filtered, the resulting product (a very fine powder containing 24.6% of Mg, 71.8% of Cl and 0.5% of Al) was repeatedly washed with heptane and reacted with TiCl$_4$ as in Examples 1 to 5.

EXAMPLE 27

Anhydrous gaseous HCl in excess was bubbled at room temperature into a suspension of 20.2 g of MgCl$_2$.2AlEtCl$_2$ in 100 cc of heptane. A solid decomposition product was thus obtained, in which the Mg/Al atomic ratio was about ½. Such solid was washed with n-heptane and 8.0 g of same were reacted with 3.9 g of TiCl$_4$ diluted with 50 cc of heptane as in Examples 1 to 5.

EXAMPLE 28

9.5 g of C$_2$H$_5$OH diluted with 50 cc of n-heptane were added, over a period of 30 minutes to a suspension of 30.5 g of MgCl$_2$.2AlEtCl$_2$ in 150 cc of n-heptane, keeping a temperature of 30° C. The whole was kept under stirring for a further 60 minutes at the same temperature, then filtered, and the resulting solid product was washed 4 times with heptane and dried under vacuum at 50° C.

3.5 g of the product thus obtained were reacted with 51.5 g of TiCl$_4$ for 1 hour at 136° C. The reaction mass was allowed to cool to room temperature and, after filtration, the resulting solid product was washed 4

Table VIII records the details of Examples 29 to 31 in which catalyst components (A) were prepared by reaction of β-TiCl$_3$ in flakes with MgCl$_2$.2AlEtCl$_2$ dissolved in AlEtCl$_2$. The final catalysts prepared from components (A) according to Examples 29 to 31 exhibit an activity considerably higher than that of the catalysts prepared from components (A) in which the Ti compound is β-TiCl$_3$, and yield polymers having good morphological and free-flowing characteristics.

EXAMPLES 29–31

A certain amount of β-TiCl$_3$ in flakes (prepared by reduction of TiCl$_4$ with AlEt$_2$Cl and containing 22.0% of Ti and 4.9% of Al) was suspended in 100 cc of n-heptane, and to the suspension, cooled down to −5° C, there was added, under stirring, and in about 15 min., the given amount of a solution of MgCl$_2$.2AlEtCl$_2$ in AlEtCl$_2$ heated to 100° C, in order to keep it in the liquid state (such solution contained 15.7% by weight of MgCl$_2$). At the conclusion of such addition, the temperature was allowed to rise to 15° C, and held at that temperature for 1 hour. An additional 100 cc of n-heptane were admixed, and the mass was kept under stirring at 15° C for another hour. Finally it was filtered, the solid was repeatedly washed with n-heptane, and dried under vacuum at 50° C to constant weight.

TABLE VIII

Catalysts from MgCl$_2$ . 2AlEtCl$_2$ and β-TiCl$_3$ Flakes

| Example No. | β-TiCl$_3$ g | Solution of MgCl$_2$ . 2AlEtCl$_2$ g | Catalyst Analysis | | Polymerization of ethylene | | | |
|---|---|---|---|---|---|---|---|---|
| | | | Ti % | Mg/Ti | Catalyst g | Polymer g | Yield | Melt Index |
| 29 | 3.65 | 10.45 | 9.30 | 0.72 | 0.023 | 178 | 83,200 | 0.09 |
| 30 | 1.60 | 22.70 | 3.15 | 3.98 | 0.034 | 69 | 64,400 | 0.15 |
| 31 | 0.80 | 24.50 | 1.25 | 10.7 | 0.058 | 91 | 124,600 | 0.63 |

Table IX reports the operating conditions and the results of some runs on the polymerization of propylene in liquid monomer (Examples 32, 33, 34) and in a solvent (Examples 35, 36). These runs were carried out in the presence of the catalysts prepared, respectively, in Examples 26, 3, 11, 3 and 11, employing, as component (B), AlEt$_3$ mixed with ethyl anisate as complexing agent.

TABLE IX

| Operating Conditions | Polymerization of Propylene | | | | | | |
|---|---|---|---|---|---|---|---|
| | Example No. | Catalyst (type) | Catalyst g | Polymer g | Yield | I.I. (*) | Bulk Density g/cc |
| IN LIQUID MONOMER | | | | | | | |
| Stainless steel autoclave having a 30 l capac. | 32 | of Ex. 26 | 2.000 | 850 | 141,500 | 82.0 | — |
| Propylene = 10 kg AlEt$_3$ = 12.5 g in 90 cc of heptane Ethyl anisate = 7.25 g in 120 cc of heptane (AlEt$_3$/anisate molar ratio = 3.1) H$_2$ = 25 Nl | 33 | of Ex. 3 | 0.480 | 285 | 14,130 | 73.0 | 0.19 |

TABLE IX-continued

| | Polymerization of Propylene | | | | | |
|---|---|---|---|---|---|---|
| Operating Conditions | Example No. | Catalyst (type) | Catalyst g | Polymer g | Yield | I.I. (*) | Bulk Density g/cc |
| The catalyst is suspended in 170 cc of heptane Temperature = 65° C Pressure = 26.5 kg/cm²g. — Time = 5 h. | 34 | of Ex. 11 | 1.508 | 870 | 52,440 | 81.4 | 0.38 |
| | IN A SOLVENT (n-HEPTANE) | | | | | | |
| Stainless steel autoclave, capacity 2.5 l Heptane = 1000 cc AlEt₃ = 1.135 g Ethyl anisate = 0.45 g — AlEt₃/anisate molar ratio = 4 H₂ = 1.5% by vol. with respect to the gas phase Temperature = 60° C Total pressure = 5.0 kg/cm²g. Time = 5 hours | 35 | of Ex. 3 | 0.262 | 25 | 2,490 | — | — |
| | 36 | of Ex. 11 | 0.147 | 37 | 22,880 | 72.3 | — |

(*) Isotacticity index (percentage of polymer insoluble in boiling n-heptane)

Table X reports the details of Examples 37 and 38, in which catalyst components (A) were prepared by reaction in n-heptane of Ti(O-n-$C_4H_9$)$_4$ or V-triacetylacetonate with the complex $MgCl_2.2AlC_2H_5Cl_2$, and the use of same in the polymerization of ethylene.

The operating conditions in said Examples were as follows:

EXAMPLE 37

3.10 g of the complex $MgCl_2.2AlC_2H_5Cl_2$ in powder form were introduced into a 250 cc glass flask equipped with stirrer and reflux cooler and cooled to 0° C, whereupon 6.30 g of Ti(O-n-$C_4H_9$)$_4$, also cooled to 0° C, were added thereto in 30 minutes.

At the conclusion of the addition, the temperature was brought to 25° C and the mixture was diluted with 150 cc of anhydrous n-heptane. It was then heated up to the solvent boiling point (98° C), and held under refluxing for 1 hour. After cooling, the solid contained was filtered on fritted bottom G3 in a nitrogen atmosphere, thoroughly washed on the filter with n-heptane until the disappearance of Cl' ions from the filtrate, and then dried under vacuum at 50° C to constant weight.

EXAMPLE 38

2.5 g of vanadium triacetylacetonate dissolved in 50 cc of anhydrous toluene were introduced, in a nitrogen atmosphere, into a 100 cc glass flask. 5.0 g of $MgCl_2.2AlC_2H_5Cl_2$ were added thereto at room temperature, under stirring and over a period of 30 minutes.

At the conclusion of the addition, stirring was carried on for a further 2 hours. A light green solid product formed. It was filtered and then washed on the filtering bottom first with toluene and successively with n-heptane. Finally, the product was dried under vacuum at 40° C to constant weight.

We claim:

1. Components of catalysts for the polymerization of olefins consisting of the product prepared by contacting (1) a compound of Ti, V or Zr selected from the group consisting of halides, alcoholates, phenolates, acetylacetonates, and alkyl or polyoxyalkyleneglycol esters of acids derived from Ti, V or Zr, with (2) the decomposition product of a complex having the general formula $$MX_2.nAlRX_2.pAlX_3 \qquad (I)$$

in which
M is Mg or Mn;
X is Cl or Br in the case of $MX_2$ and $AlX_3$, and Cl, Br or an alkoxy group in the case of $AlRX_2$;
R is a hydrocarbon radical containing from 1 to 20 carbon atoms;
n is a number from 1 to 4, inclusive;
p is a number from 0 to 1, inclusive; and
$1 \leq n + p \leq 4$,
said decomposition product comprising the dihalide $MX_2$.

2. The catalyst components of claim 1, in which R in formula (I) is al alkyl radical containing from 1 to 10 carbon atoms, inclusive, a cycloalkyl radical containing from 6 to 8 carbon atoms, inclusive, or an aryl radical.

3. Catalyst components according to claim 1, and consisting of the product prepared by contacting Ti $Cl_4$ with the decomposition product of the complex of formula (I).

4. A catalyst component according to claim 3, consisting of the product prepared by contacting Ti $Cl_4$ with the decomposition product of the complex Mg $Cl_2$ . 2 Al $C_2$ $H_5$ $Cl_2$.

5. A catalyst component according to claim 1, and consisting of the product prepared by contacting Ti $Cl_3$ with the decomposition product of the complex Mg $Cl_2$ . 2 Al $C_2$ $H_5$ $Cl_2$.

6. A catalyst component according to claim 1, and consisting of the product prepared by contacting Ti ($OCH_3$) $Cl_3$ with the product resulting from decomposition of the complex Mg $Cl_2$ . 2 Al $C_2$ $H_5$ $Cl_2$.

7. A catalyst component according to claim 1, and consisting of the product prepared by contacting Ti (O-n-$C_4$ $H_9$)$_4$ with the decomposition product of a complex of formula (I).

TABLE X

| | Catalysts prepared from MgCl₂ . 2AlEtCl₂ and from Ti(O-n-C₄H₉)₄ or vanadium triacetylacetonate and use of same in the polymerization of ethylene | | | | | | | | | | | |
|---|---|---|---|---|---|---|---|---|---|---|---|---|
| | MgCl₂. | | V Acetyl- | Mg/M' Under Reaction | Al/M' Under Reaction | Catalyst Analysis | | | Ethylene Polymerization | | | |
| Example No. | 2AlEtCl₂ g | Ti(OC₄H₉)₄ g | acetonate g | (*) | (*) | M' (*) % | Mg/M' (*) | Al/M' (*) | Catalyst g | Polymer g | Yield | Melt Index |
| 37 | 3.10 | 6.30 | — | 0.47 | 0.96 | 12.30 | 0.84 | 0.36 | 0.0168 | 265 | 132,500 | 0.70 |
| 38 | 5.0 | — | 2.5 | 2.01 | 4.02 | 9.55 | 1.93 | 0.02 | 0.023 | 117 | 55,700 | 41.1 |

(*)M' = Ti or V.

8. A catalyst component according to claim 7, and consisting of the product prepared by contacting Ti (O-n-C$_4$ H$_9$)$_4$ with the decomposition product of the complex Mg Cl$_2$. 2 Al C$_2$ H$_5$ Cl$_2$.

9. Catalyst components according to claim 1, and consisting of the products prepared by contacting vanadium triacelylacetonate with decomposition products of complexes of formula (I).

10. A catalyst component according to claim 9, and consisting of the product prepared by contacting vanadium triacetylacetonate with the decomposition product of the complex Mg Cl$_2$. 2 Al C$_2$ H$_5$ Cl$_2$.

11. Catalyst components according to claim 1, and further characterized in being supported on silica and/or γ-alumina.

12. Process for preparing the catalyst components according to claim 1, characterized in that the Ti, V or Zr compound is reacted with the complex MX$_2$. n AlR X$_2$. p AlX$_3$ in a M/transition metal atomic ratio of from 0.1 to 50, inclusive, at a temperature between 0° and 150° C, and the solid reaction product thus obtained is separated from the liquid phase.

13. The process of claim 12, in which the Ti, V or Zr compound is reacted with the complex MX$_2$. n AlR X$_2$ . p AlX$_3$ in a hydrocarbon solvent.

14. The process of claim 12, in which the complex MX$_2$. n AlR X$_2$. p AlX$_3$ is pulverized in the presence of the Ti, V or Zr compound.

15. The process of claim 12, in which the complex MX$_2$. n AlR X$_2$ . p AlX$_3$ is pre-activated by grinding before it is reacted with the Ti, V or Zr compound.

16. The process of claim 12, in which the Ti, V or Zr compound is reacted with a halide MX$_2$ and a compound AlR X$_2$ in an inert hydrocarbon solvent at a temperature of from 50° to 120° C, inclusive, whereby a complex MX$_2$. n AlR$_2$ is formed in situ and reacts with the Ti, V or Zr compound.

17. The process of claim 12, in which the Ti, V or Zr compound is contacted with the decomposition product of the complex MX$_2$. n AlR X$_2$. p AlX$_3$, which decomposition product comprises the metal halide MX$_2$.

18. The process of claim 17, in which the complex is decomposed by treatment thereof in a hydrocarbon solvent with an excess of anhydrous, gaseous HCl, at room temperature.

19. The process of claim 17, in which the complex is decomposed by treatment of a solution thereof in a hydrocarbon solvent with a Lewis base.

20. The process of claim 17, in which the complex is decomposed by treating a solution thereof in a hydrocarbon solvent with an organometallic compound of aluminum.

21. The process of claim 20, in which the decomposition of the complex is effected at the boiling temperature of the hydrocarbon solvent.

22. The process of claim 20, in which the organometallic compound has the formula Al R$_2$X in which R is an alkyl, cycloalkyl or aryl radical containing from 1 to 20 carbon atoms, inclusive, and X is a halogen atom or a hydrocarbon group R.

23. The process of claim 17, in which the complex is decomposed by treating a solution thereof in a hydrocarbon solven with an aliphatic or cycloaliphatic alcohol containing from 1 to 20 carbon atoms, inclusive, at a temperature of from −20° to +150° C, inclusive.

24. Catalysts for polymerizing olefins and obtained by mixing
(A) the product prepared by contacting (1) a compound of Ti, V or Zr selected from the group consisting of halides, alcoholates, phenolates, acetylacetonates and alkyl or polyoxyalkyleneglycol esters of acids derived from the metals, with (2) the product resulting from the decomposition of a complex of the general formula $$MX_2.nAlRX_2.pAlX_3 \qquad (I)$$

in which
M is Mg or Mn;
X is Cl or Br in the case of MX$_2$ and AlX$_3$, and Cl, Br or an alkoxy group in the case of AlRX$_2$;
R is a hydrocarbon radical containing from 1 to 20 carbon atoms, inclusive;
n is a number from 1 to 4, inclusive;
p is a number from 0 to 1, inclusive; and
$1 \leq n + p \leq 4$,
to a product comprising the dihalide of MgX$_2$ with
(B) an organometallic compound of a metal belonging to one of Groups I to III inclusive of the Mendelyeev Periodic Table.

* * * * *

UNITED STATES PATENT AND TRADEMARK OFFICE
CERTIFICATE OF CORRECTION

PATENT NO. : 4,089,808
DATED : May 16, 1978
INVENTOR(S) : Umberto ZUCCHINI et al It is certified that error appears in the above—identified patent and that said Letters Patent is hereby corrected as shown below:

Cols. 5-6, Table 1, 3rd heading - "$TiCl_g$" should read --- $TiCl_4$ ---.

Col. 11, Ex. 37, line 35   "contained" should read --- obtained ---.

Cols. 11-12, Table X, under Melt Index   "$\frac{0.70}{41.1}$ should read --- $\frac{0.70}{41.4}$ ---.

Col. 12, line 35   "al" should read --- an ---.

Col. 14, line 18   "solven" should read --- solvent

Signed and Sealed this

Twenty-fourth Day of February 1981

[SEAL]

Attest:

RENE D. TEGTMEYER

*Attesting Officer*   *Acting Commissioner of Patents and Trademarks*